(12) United States Patent
Lobovsky et al.

(10) Patent No.: US 6,432,179 B1
(45) Date of Patent: Aug. 13, 2002

(54) VAPOR-ADSORBENT FILTER FOR REDUCING EVAPORATIVE FUEL EMISSIONS, AND METHOD OF USING SAME

(75) Inventors: Alex Lobovsky, New Providence; James Matrunich, Mountainside; Daniel Bause, Flanders, all of NJ (US); Gordon Jones, Toledo, OH (US); Ronald Rohrbach, Flemington, NJ (US); Gary Zulauf, Findlay, OH (US); Peter Unger, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/822,102

(22) Filed: Mar. 30, 2001

(51) Int. Cl.[7] ........................ B01D 39/04; B01D 39/16
(52) U.S. Cl. .................. 96/296; 55/477; 55/483; 55/498; 55/527; 55/DIG. 19; 428/398
(58) Field of Search ................ 96/290, 296, 154; 95/146, 143; 123/573, 198 E; 428/397, 398; 55/385.3, 477, 483, 490, 511, 498, 518, 527, DIG. 19, DIG. 28

(56) References Cited

U.S. PATENT DOCUMENTS

| | | | |
|---|---|---|---|
| 3,393,669 A | * 7/1968 | Vardi et al. | |
| 3,747,303 A | * 7/1973 | Jordan | |
| 4,133,762 A | 1/1979 | Visceglia et al. | 210/186 |
| 5,057,368 A | 10/1991 | Largman et al. | 428/397 |
| 5,072,713 A | * 12/1991 | Sweeten | 123/573 |
| 5,085,766 A | * 2/1992 | Born | 210/150 |
| 5,429,099 A | 7/1995 | DeLand | 123/520 |
| 5,453,118 A | 9/1995 | Heiligman | 96/147 |
| 5,471,966 A | * 12/1995 | Feuling | 123/572 |
| 5,702,508 A | * 12/1997 | Moratalla | 96/154 |
| 5,704,966 A | 1/1998 | Rohrbach et al. | 95/170 |
| 5,713,971 A | 2/1998 | Rohrbach et al. | 55/233 |
| 5,744,236 A | 4/1998 | Rohrbach et al. | 428/372 |
| 5,759,394 A | 6/1998 | Rohrbach et al. | 210/264 |
| 5,891,221 A | 4/1999 | Rohrbach et al. | 95/159 |
| 5,902,384 A | 5/1999 | Rohrbach et al. | 96/296 |
| 5,912,368 A | 6/1999 | Satarino et al. | 55/320 |
| 5,951,744 A | 9/1999 | Rohrbach et al. | 96/154 |
| 6,004,381 A | 12/1999 | Rohrbach et al. | 95/211 |
| 6,048,614 A | 4/2000 | Rohrbach et al. | 428/372 |
| 6,117,802 A | 9/2000 | Rohrbach et al. | 442/372 |
| 6,127,036 A | 10/2000 | Xue et al. | 428/400 |
| 6,190,432 B1 | * 2/2001 | Gieseke et al. | 55/385.3 |

* cited by examiner

*Primary Examiner*—David A. Simmons
*Assistant Examiner*—Frank M. Lawrence (57) ABSTRACT

A filter, for use in removing residual fuel vapors from within an engine's intake system, includes a filter element having a plurality of fibers, for placement in communication with an intake air flow passage. Each of the fibers has an internal cavity formed therein, and a longitudinally extending slot formed therein extending from the internal cavity to the outer fiber surface. The filter also includes a hydrocarbon-absorbing material disposed within the internal cavities of the fibers. The hydrocarbon-absorbing material may be a solid material such as, e.g., carbon, or may be a liquid such as a relatively non-volatile organic solvent. Alternatively, the material may be a combined solid and liquid. In one embodiment, each of the elongated fibers includes a central stem and a plurality of lobes extending outwardly from the central stem, with a longitudinally extending slot defined between adjacent lobes. Specific useful filter configurations are detailed.

16 Claims, 12 Drawing Sheets

VAPOR-ADSORBENT FILTER FOR REDUCING EVAPORATIVE FUEL EMISSIONS, AND METHOD OF USING SAME

BACKGROUND OF THE INVENTION

1. Field of the invention

The present invention relates to a filter for reducing evaporative fuel emissions from an internal combustion engine. More particularly, the present invention relates to a filter for placement on an engine, downstream of a throttle plate, to adsorb evaporative emissions after the engine has been turned off.

2. Description of the Background Art

The great majority of internal combustion engines in use today are fuel-injected engines. When a fuel-injected engine is switched off after use, a small amount of residual fuel volatilizes and escapes from the injector tips. While a vehicle is sitting over time after use, this evaporated fuel may pass outwardly through the intake manifold, the intake air ducts and air filter, and may escape into the atmosphere, thus contributing to air pollution. It would be desirable to minimize this type of inadvertent evaporative emissions leakage.

Many different types of filters are known for use in filtering evaporative fuel emissions in specific applications. Examples of some of the known filter types are described in U.S. Pat. Nos. 4,133,762, 5,429,099, 5,453,118, and 5,912,368.

The assignee of the present invention has developed a new type of 'wicking' fiber material that has been used for some filter applications. This material includes hollow spaces within the individual fibers, and this hollow space may be used to house a reactive or adsorbent material. Some issued patents relating to this wicking fiber, and to filters containing this type of fiber include U.S. Pat. Nos. 5,057,368, 5,704,966, 5,713,971, 5,744,236, 5,759,394, 5,891,221, 5,902,384, 5,951,744, 6,004,381, 6,048,614, 6,117,802, and 6,127,036. Other patents using this fiber technology are pending.

Although the known devices have utility for their intended purposes, a need still exists in the art for an improved evaporative emissions filter, adapted to adsorb fuel vapors within an intake system of an internal combustion engine, subsequent to the engine being turned off. Preferably, such a filter would be capable of regeneration, so as to be repeatably usable over many cycles of engine operation.

SUMMARY OF THE INVENTION

The present invention provides a filter for use in removing residual fuel vapors from within an engine's intake system, downstream of a throttle body, after the engine has been turned off.

A filter in accordance with the present invention, generally, includes:
 a filter element for placement within an intake air flow passage, the filter element comprising a plurality of fibers;
 each of the fibers having an outer surface;
 each of the fibers further having a longitudinally extending internal cavity formed therein, and having a longitudinally extending slot formed therein extending from the internal cavity to the outer fiber surface; and
 wherein the filter further comprises a hydrocarbon-adsorbing material disposed within the internal cavities of the fibers.

The hydrocarbon-adsorbing material may be a solid material such as, e.g., carbon, or may be a liquid such as a relatively non-volatile organic solvent. Suitable organic solvents, which may be used in the fiber cavities, include mineral oils and paraffin oils.

In one embodiment of the invention, each of the elongated fibers includes a central stem and a plurality of lobes extending outwardly from the central stem, with each lobe having a longitudinally extending internal cavity on each side thereof, whereby a longitudinally extending slot is defined between adjacent lobes.

It is preferred that the filter be constructed and arranged to minimize pressure drop therepast, limiting the pressure drop to less than 5 inches of mercury at a flow rate of 5,000 cubic feet per minute (CFM) of air flow therepast.

Accordingly, it is an object of the present invention to provide a filter element for placement in an intake flow passage of an engine, the filter element being adapted to adsorb fuel vapors from ambient air in the immediate surrounding area.

It is a further object of the present invention to provide a method and apparatus for removing residual fuel vapors from an engine's intake system, downstream of the throttle body, after the engine has been turned off.

It is yet a further object of the invention to provide a filter for adsorbing fuel vapors out of ambient air, in which the filter minimizes pressure drop therepast, so as not to interfere with the free flow of air to the engine.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENTS

FIRST EMBODIMENT

Referring now to FIGS. 1–7, a filter in accordance with a first embodiment of the invention is shown generally at 10. The filter 10 is provided for placement in an intake airflow passage 15, associated with an internal combustion engine (not shown). The airflow passage 15 does not form a part, per se, of the present invention. The filter 10 may be placed extending across a flow passage such as, for example, a portion of an intake manifold or a throttle body.

Figure 3:
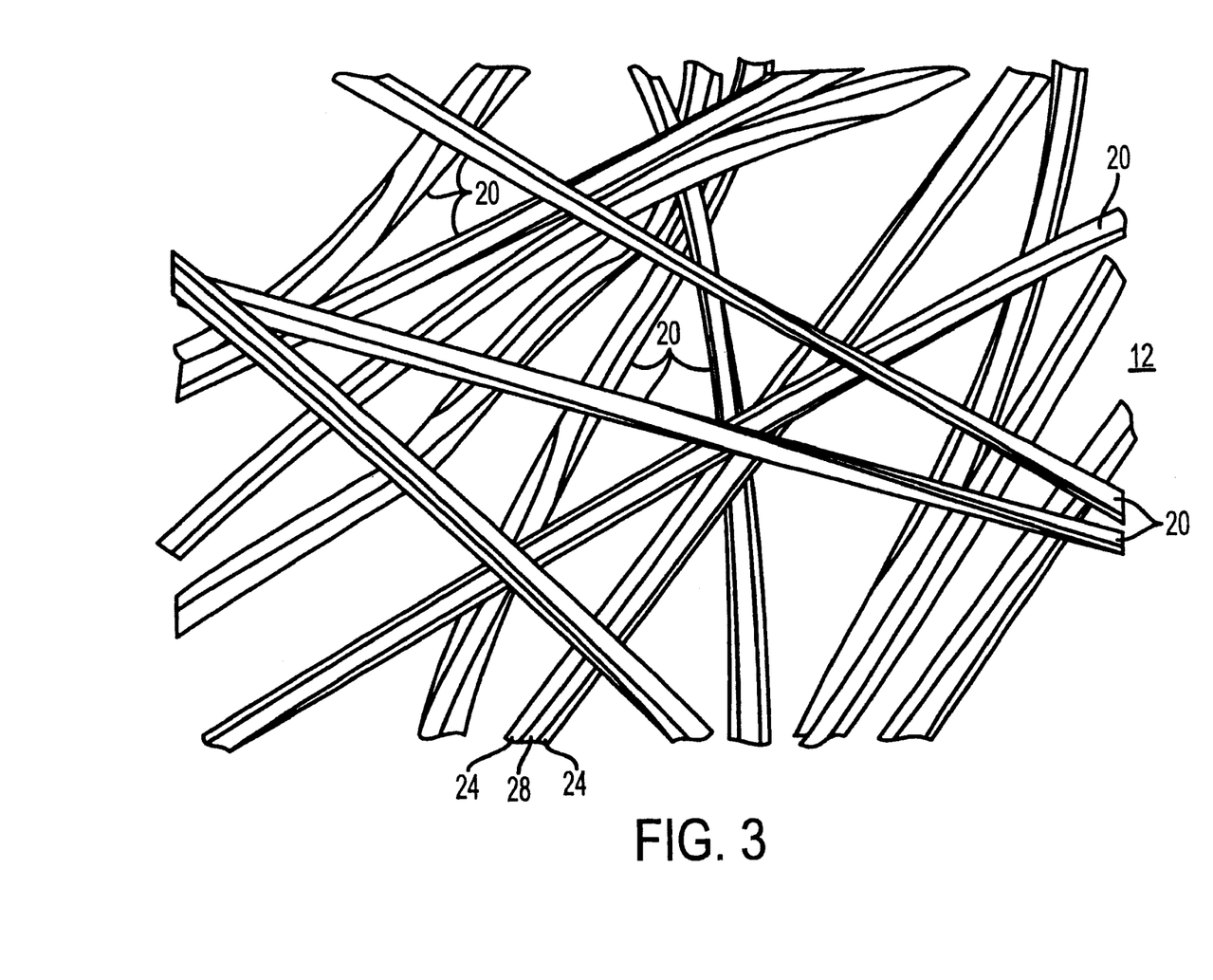
FIG. 3 is an enlarged perspective detail view of the nonwoven fiber mat of FIG. 2, formed of wicking fibers according to the present invention.

The filter 10 includes a filter element 11, which comprises a porous non-woven fiber web 12 made up of a plurality of individual fibers 20 (FIG. 3). In the filter element 1 1, the fiber web 12 is preferred to be made in a loose weave with relatively large air pockets between the fibers, in order to minimize pressure drop thereacross.

The pressure drop across the filter 10 is less than 5 inches of mercury at 5,000 cubic feet per minute of flow. Preferably, the pressure drop is less than 3 inches of mercury at 5,000 cubic feet per minute of flow.

Figure 2:
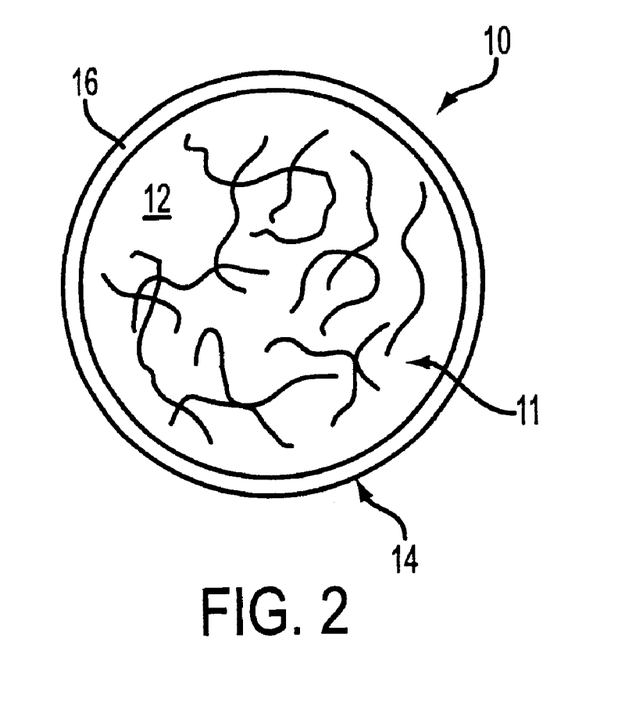
FIG. 2 is a front plan view of the filter element of FIG. 1, showing a nonwoven fiber mat, and also showing a solid frame surrounding the nonwoven fiber mat.

Optionally, if desired, the filter 10 may include a reinforcing frame member 14, such as the peripheral band 16 shown in FIG. 2, attached to and surrounding the fiber web 12, in order to provide support thereto, and to provide a solid member for engaging a side wall of the air flow passage 15. Alternatively, the filter element 11 may consist primarily of a fiber web 12, adapted to be attached to the inside surface of the structural element defining the air flow passage 15.

The Wicking Fibers

As noted, the filter element 11 comprises a nonwoven fiber web 12, which is retained in the air flow passage 15. The fiber web 12 is formed from a multiplicity of intertwined wicking fibers 20, as shown in FIGS. 3 through 6.

Each of the wicking fibers 20 incorporates a vapor-adsorbent substance therein, selected for its capacity to react with vaporized fuel which may be present in the air being filtered, so as to remove a significant amount of the fuel vapor and prevent escape thereof. The vapor-adsorbent substance may be solid, liquid, or a combination of them.

Figure 4:
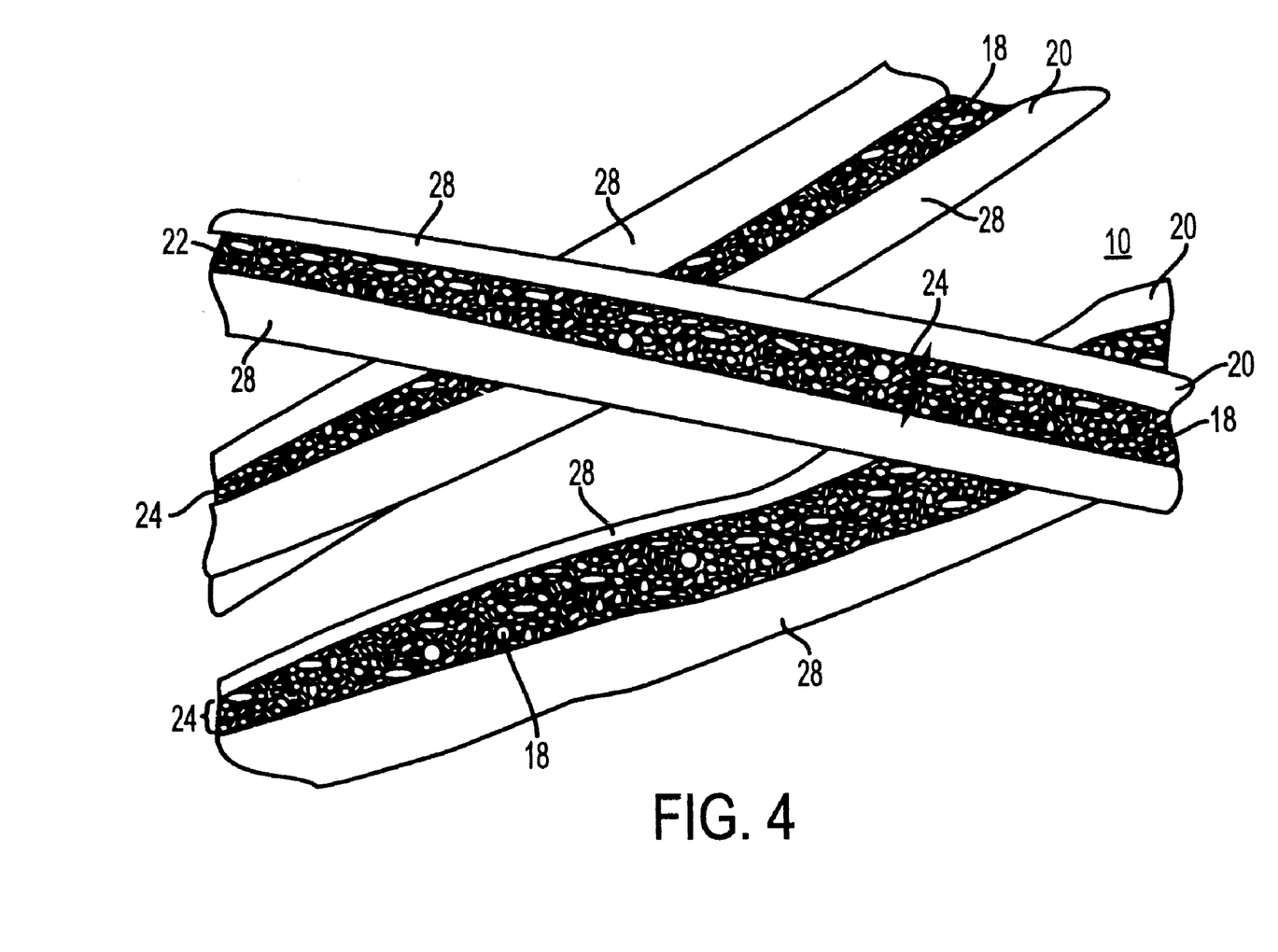
FIG. 4 is a further enlarged perspective detail view of the nonwoven fiber mat of FIGS. 2–3, showing a solid component entrained in cavities of the fibers.
Figure 5:
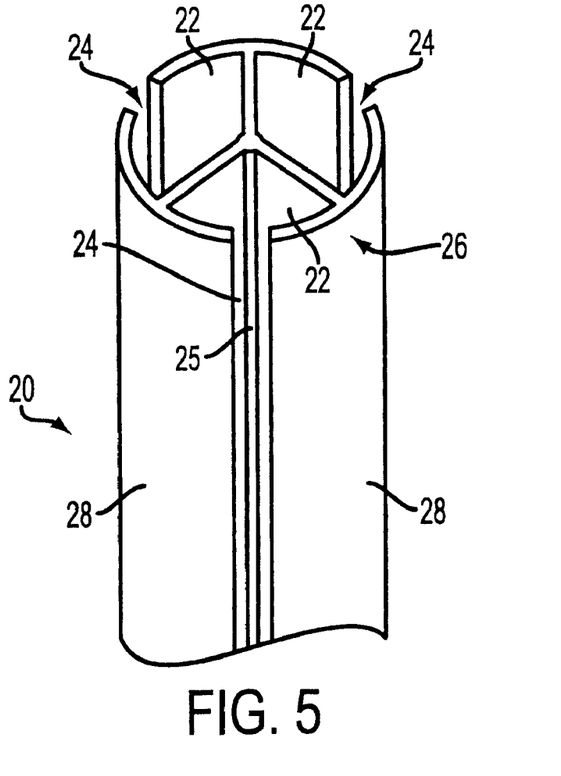
FIG. 5 is an enlarged perspective view of a three-lobed wicking fiber, which is usable in the practice of the present invention.
Figure 6:
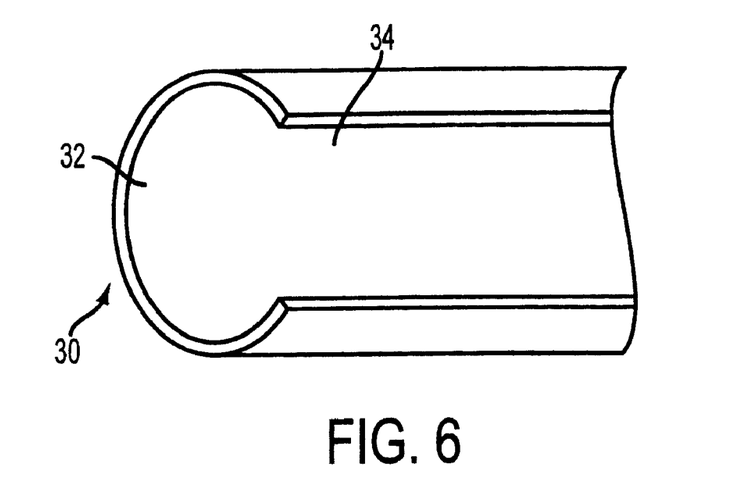
FIG. 6 is an enlarged perspective view of an alternative wicking fiber which is usable in the practice of the present invention, having a C-shaped cross-section with a single cavity formed therein.
Figure 7:
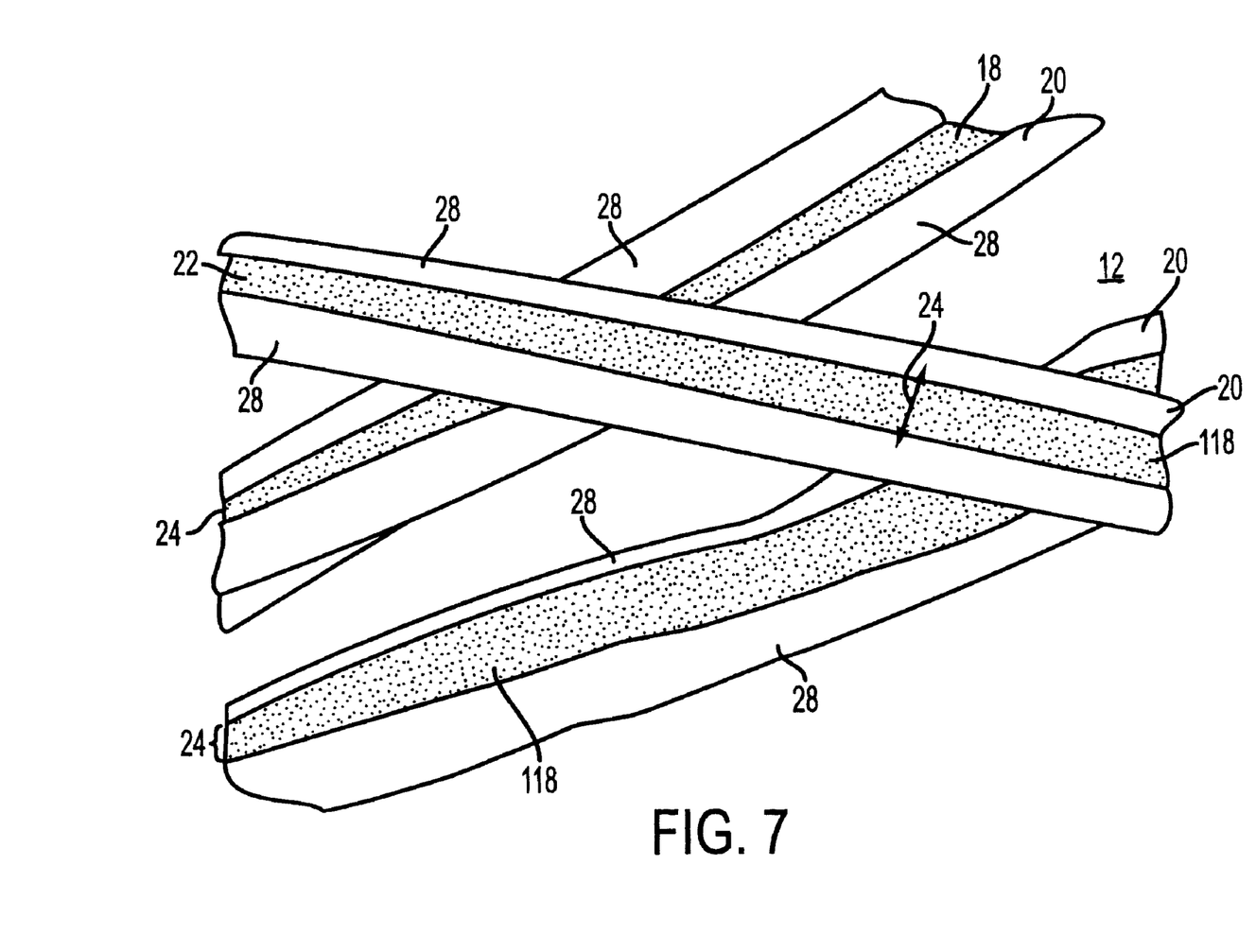
FIG. 7 is an enlarged perspective detail view of the nonwoven fiber mat of FIG. 3, showing a liquid component entrained in cavities of the fibers.

FIGS. 3–5 show the fibers 20 making up the web 12 in an increasing level of detail and magnification in each succeeding figure. FIG. 3 shows an enlarged detail view of a number of the intertwined fibers 20 making up the web 12. FIG. 4 shows a further magnified detail view of the fibers 20, and also shows a number of solid particles 18 as one example of a substance which may be disposed therein. FIG. 5 is a close-up detail perspective view of an end of one preferred fiber 20, with the substance deleted from the drawing for purposes of illustration, and FIG. 6 shows an alternative configuration for a fiber 30 which is usable in the practice of the present invention. FIG. 7 is similar to FIG. 4, but shows that a liquid substance 118 may be present in place of the solid particles 18 shown in FIG. 4.

A wicking fiber that is particularly suitable for practicing this invention is disclosed in U.S. Pat. No. 5,057,368, the disclosure of which is incorporated by reference. This patent discloses a fiber formed from thermoplastic polymers, wherein the fiber has a cross-section with a central core or stem 25, and a plurality of substantially T-shaped lobes 26 (FIG. 5). The legs of the lobes 26 intersect at the core 25, so that the angle between the legs of adjacent lobes is from about 80 degrees to 130 degrees. The thermoplastic polymer is typically a polyamide, a polyimide, a polyester, a polyolefin, a polysulfone, or a combination thereof. The wicking fiber as illustrated in FIG. 5 is formed as an extruded strand having three hollow longitudinally extending interior cavities 22, each of which communicates with the outer strand surface 28 by way of longitudinally extending slots 24 defined between adjacent lobes 26.

The wicking fibers 20 are relatively small, having a diameter in a range between 30 and 250 microns. The width of the longitudinal extending slots 24 is normally less than one half of the diameter of the fibers 20.

Referring now to FIGS. 4 and 5, the fiber 20, the width of the slots 24, and the particles 18 to be entrapped within the interior cavities 22 are selected so that when the particles 18 are forced into the longitudinal cavities 22 they are retained therein. The small solid particles 18 become mechanically trapped within the longitudinal cavities 22 of the fibers 20, and are retained therein. This approach can be extended to substantially any powder, or other finely divided solid material, which one would like to entrap within a fiber medium, and which would be effective in entrapping fuel vapors.

A particularly preferred solid material for trapping fuel vapors is a large pore wood-based carbon. Preferably, the substance used will have the capability of being regenerated, such as, for example, the ability to release loosely bound fuel molecules when the ambient temperature is increased, such as when an engine reaches operating temperature. This property will allow the filter 10 to have a prolonged effective useful life.

After the fine solid particles are entrapped, the wicking fiber 20 may additionally be impregnated with a liquid substance. Alternatively, the wicking fiber may be impregnated solely with a liquid substance 118, as illustrated in FIG. 7. Suitable organic solvents, which may be used in the fiber cavities, include mineral oils, paraffin oils, and similar non-volatile organic solvents.

The capillary forces within the individual cavities 22 are much greater than those external to the fiber 20, such that a liquid substance is readily wicked up within the interior of the fiber 20 without appreciable wetting of the external surfaces 28 or filling the inter fiber voids. The fibers 20 strongly retain the liquid through capillary action, so that the nonwoven web 12 is not wet to the touch, and the liquid will not shake off. In a nonwoven web 12 of such wicking fibers 20, the area between the individual strands remains relatively free of the fine particles 18, and of any liquid or other substance with which the internal cavities 22 of each fiber 20 are filled.

The fibers 20 may be made of one or more type of wicking material strands such as polyamides, polyimides, polyesters, polysulfones, polyolefins, or other suitable polymeric material which may be formed into the desired configuration, and which is stable with respect to the substance stored therein and the fluid being filtered therethrough. The multiple cross-sectionally T-shaped segments may have their outer surface 28 curved, as shown, or straight. While the wicking fiber 20 is depicted as tri-lobed in FIG. 5, it will be understood that any other number of lobes are suitable, particularly two, four or five lobes.

In addition other internal wicking fibers may be used, such as the C-shaped fiber shown in FIG. 6, having a single longitudinal extending slot 34, and a single longitudinally extending cavity 32. Other cross-sectional shapes may also be suitable for retaining substances therein. The specific shape of the wicking fibers is not critical, so long as the fibers selected can hold the vapor-adsorbent substance 18 within its cavities 22, such that it is not easily displaced.

Using the Filter

In using the filter 10, it is placed into the air flow passage 15, which is formed in a structural component associated with an intake system of an internal combustion engine, to remove fuel vapors therefrom. Once the filter 10 is in place in the air flow passage 15, it is fixed in place in the air flow passage by any suitable means of attachment.

As noted, in the preferred application thereof, the filter 10 is placed across the air flow passage 15, in a location downstream of the throttle plate, so that the filter will be exposed to fuel vapors in the intake system, after the throttle plate is closed. At such time as there is fuel vapor present in the ambient air surrounding the filter 10, the adsorbent material 18, within the fibers 20, will adsorb a significant amount of the vapor, and will temporarily trap the vaporized fuel and prevent it from escaping out of the intake system of the engine and evaporating into the atmosphere.

Later, when the engine is re-started, and the filter 10 is heated due to an increase in engine operating temperature, the fuel vapor present on the adsorbent material 18 will be released, and will pass into the intake to be burned. This release of the bound fuel will regenerate the adsorbent material, and will prepare it to adsorb more fuel in the next shutdown cycle.

Examples of Possible Alternative Structures for the Filter Element

Figure 1:
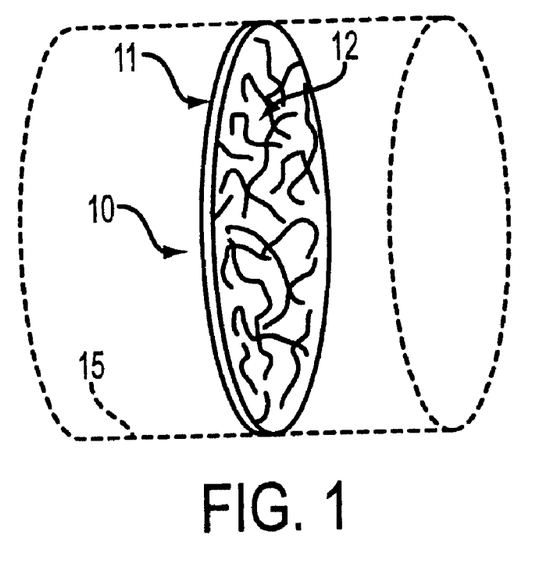
FIG. 1 is a perspective view of a filter element according to a first embodiment of the invention, and also showing a throttle body, in phantom, surrounding the filter element.

The filter 10 shown in FIGS. 1–2 is just one of many different physical configurations that the filter according to the invention may take. Several other examples of possible filter configurations are shown in other figures of the drawings, and will be discussed briefly below. All of these filters share the common characteristics that:

They incorporate wicking fibers 20 of the general type discussed previously herein, The wicking fibers have a fuel vapor-adsorbing substance disposed in the cavities thereof; and They are designed to minimize pressure drop across the filter, and to keep such pressure drop to a value below 5 inches of mercury at a flow rate of 5,000 cubic feet per minute (CFM) of airflow therepast. Preferably, the pressure drop across the filter is less than 3 inches of mercury at a flow rate of 5,000 CFM.

Many of these embodiments include frame members of various configurations, to provide structural support and reinforcement to the wicking fibers, and to hold a plurality of fibers together to form a filter element.

SECOND EMBODIMENT

Figure 8:
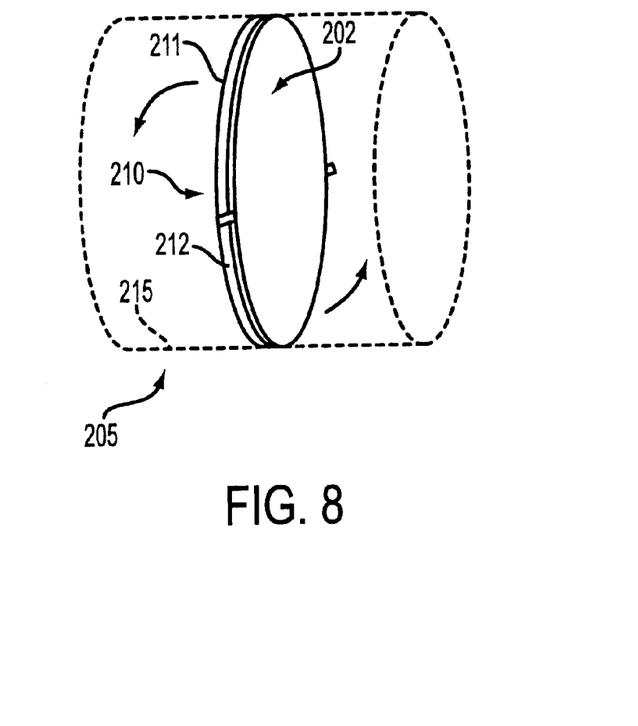
FIG. 8 is a perspective view of a filter element according to a second embodiment of the present invention, in which the filter on the throttle plate is hinged to become horizontal during engine operation.

Referring now to FIG. 8, another embodiment of a filter 210 is shown in accordance with a second embodiment of the invention. In the illustration, a throttle plate 202 is shown disposed within an intake air flow passage 215 of a throttle body 205, which is shown in phantom for purposes of illustration. The throttle plate 202 is generally conventional, and does not form a part of the present invention.

A circular disc-shaped filter element 211, in accordance with a second embodiment of the present invention, is affixed to the rear surface of the throttle plate 202. The filter element 211 may be glued on, or otherwised attached to the throttle body in conventional fashion.

The filter element 211 includes a porous non-woven fiber web 212 made up of a plurality of individual fibers 20. The fibers 20 making up the filter element 211 are the same as previously discussed in connection with the first embodiment.

The fibers 20 are impregnated with a fuel vapor-adsorbing compound, as discussed herein in connection with the filter 10 of FIGS. 1–7.

THIRD EMBODIMENT

Figure 9:
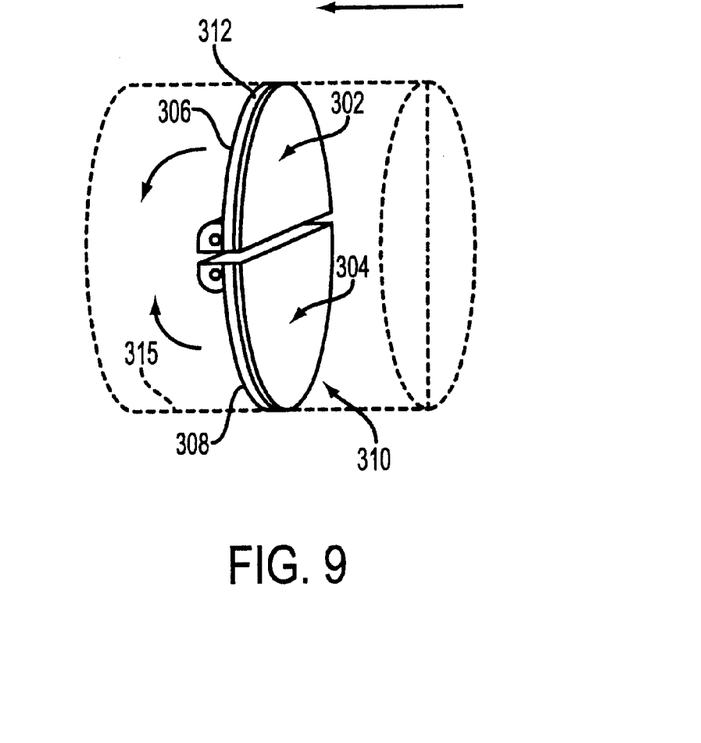
FIG. 9 is a perspective view of a filter element according to a third embodiment of the present invention, in which the filter is on a spring loaded throttle plate, hinged at the middle to fold in half during engine operation.

Referring now to FIG. 9, another filter assembly 310 is shown, in accordance with a third embodiment of the invention. In the embodiment of FIG. 9, a pair of semi-circular opposed baffle plates 302, 304 are provided for placement in an intake air flow passage 315, associated with an internal combustion engine (not shown). The filter assembly 310 may be placed in a flow passage 315 such as, for example, a portion of an intake manifold.

These baffle plates 302, 304 may be made foraminous or solid, according to the application. The baffle plates 302, 304 are each pivotally mounted in the air flow passage 315, so as to be movable between a horizontal, open position when the engine is running, and a vertical, closed position when the engine is off.

The filter 310 also includes a pair of filter elements 306, 308, made in the same semi-circular D-shape as the baffle plates, and attached to the back surface thereof by any appropriate method. Each of the filter elements includes a porous nonwoven fiber web 312 made up of a plurality of individual fibers 20, and the fibers have a fuel vapor-adsorbing compound associated therewith. The fibers 20 making up the filter elements 306, 308 are the same as previously discussed in connection with the filter 10 according to the first embodiment.

FOURTH EMBODIMENT

Figure 10:
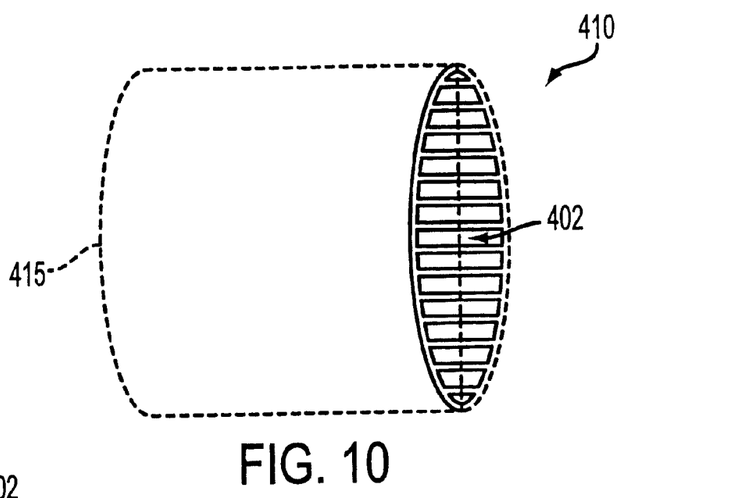
FIG. 10 is a perspective view of a filter element according to a fourth embodiment of the present invention, in which the filter is sectioned into horizontal louvers that are hinged on the sides thereof to allow pivotal movement.
Figure 10A:
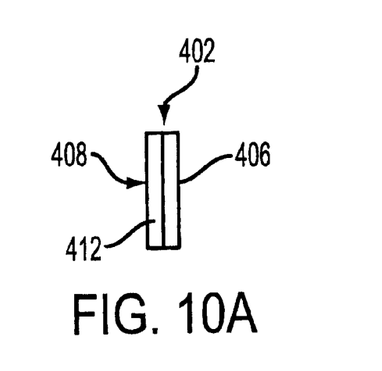
FIG. 10A is an end plan view of one of the horizontal louvers of the filter of FIG. 10.
Figure 11:
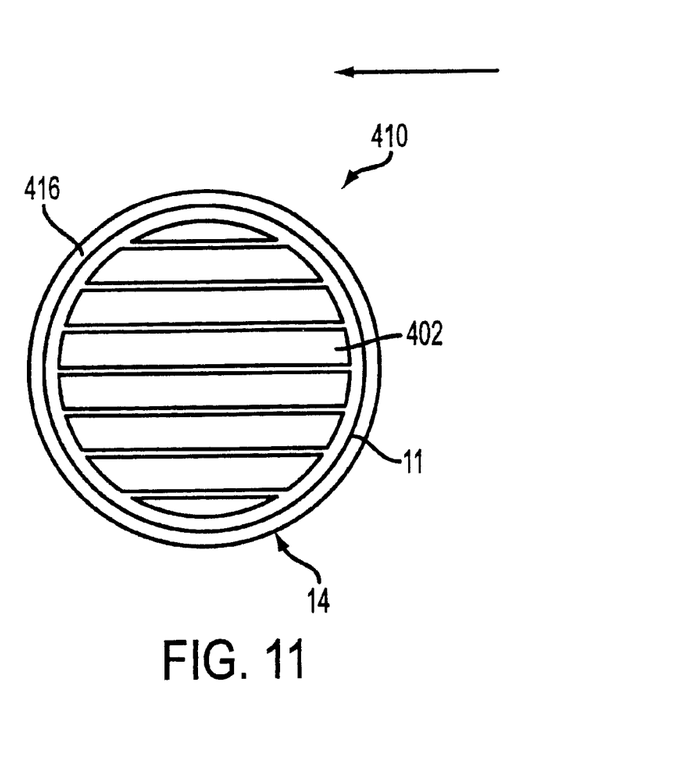
FIG. 11 is a front plan view of the filter of FIG. 10.

Referring now to FIGS. 10–11, another filter assembly is shown at 410, in accordance with a fourth embodiment of the invention. The filter 410 is provided for placement in an intake air flow passage 415 associated with an internal combustion engine (not shown). The filter 410 may be placed extending across a flow passage such as a portion of an intake manifold or a throttle body, preferably in a location downstream of the throttle plate.

The filter 410 includes an annular frame member 416 for interfering placement in the air flow passage 415. The filter 410 also includes a plurality of aligned parallel slats or louvers 402, which are each independently attached to the frame member 416, and which are interconnected via appropriate linkages, so as to be concurrently pivotally rotatable, in a manner similar to horizontal window blinds. Appropriate conventional operating hardware is attached to each of the slats 402, to open and close the slats in coordinated movement thereof. Each of the slats 402 includes a support bar 406, which may be foraminous or solid. Each of the support bars 406 carries a proportionally and correspondingly sized filter section 408 attached thereto, which comprises a porous fiber web 412 made up of a plurality of individual fibers 20. The fibers 20 making up the filter section 408 are the same as previously discussed in connection with the first embodiment.

The fibers 20 are impregnated with a fuel vapor-adsorbing compound, as discussed herein in connection with the filter 10 of FIGS. 1–7.

FIFTH EMBODIMENT

Figure 12:
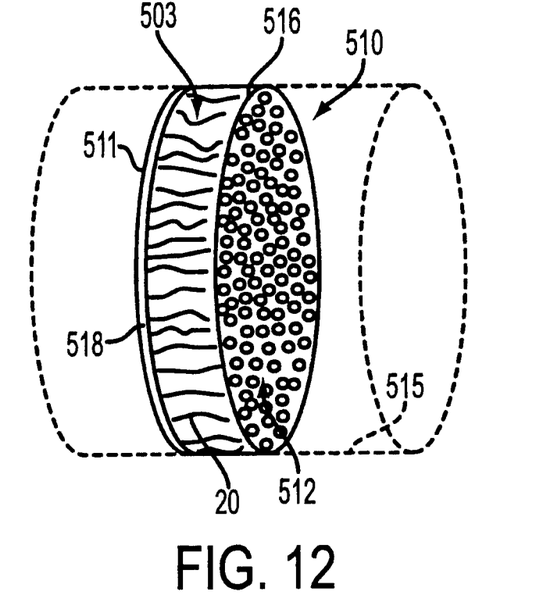
FIG. 12 is a perspective view of a filter element according to a fifth embodiment of the present invention, in which the filter includes two perforated screens with fiber strands extending therebetween.

Referring now to FIG. 12, a filter assembly is shown at 510, in accordance with a fifth embodiment of the invention. The filter 510 is provided for placement in an intake air flow passage 515 associated with an internal combustion engine (not shown). The filter 510 may be placed extending across a flow passage such as a portion of an intake manifold or a throttle body, preferably in a location downstream of the throttle plate.

The filter 510 includes a filter element 511 which has two spaced apart foraminous support screens 516, 518, which are interconnected via a center section 503, made up of a plurality of substantially parallel fiber strands 20 extending therebetween. The fibers 20 making up the center section 503 of the filter 510 are the same as previously discussed in connection with the first embodiment, except that in this case, the fibers 20 are oriented substantially parallel to one another, in order to minimize pressure drop therepast.

The fibers 20 are impregnated with a fuel vapor-adsorbing compound, as discussed herein in connection with the filter 10 of FIGS. 1–7.

SIXTH EMBODIMENT

Figure 13:
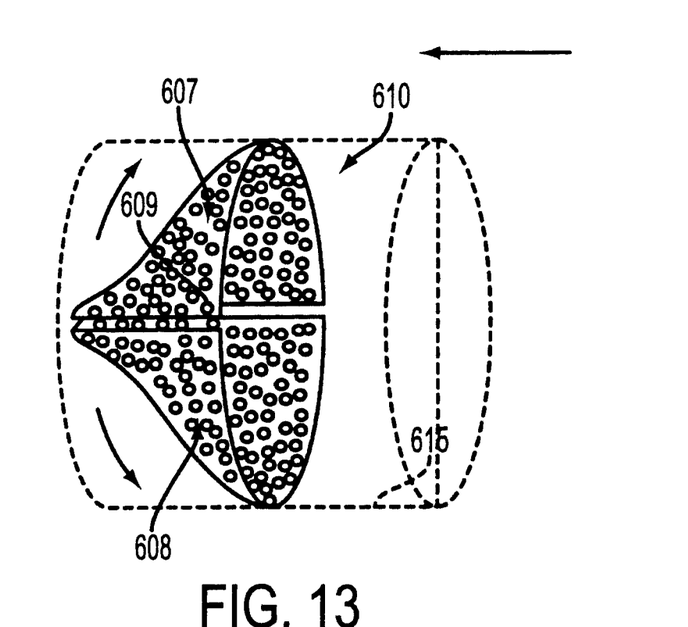
FIG. 13 is a perspective view of a filter element according to a sixth embodiment of the present invention, in which the filter is hinged to open during engine operation and close when the engine is off.

Referring now to FIG. 13, another filter assembly 610 is shown, in accordance with a sixth embodiment of the invention. In the embodiment of FIG. 13, the filter 610 includes a support member 612, which is a substantially funnel-shaped body. The support member 612 is divided along a central plane into two halves 607, 608, respectively, and hinged at 609 for placement in an intake air flow passage 615, associated with an internal combustion engine (not shown). These funnel halves 607,608 may be made foraminous or solid, as desired, according to the application. The funnel halves 607,608 are hingedly attached, at 609, to the structural component which contains the air flow passage 615 therein, so as to be movable between an open position when the engine is running, and a closed position when the engine is off. A plurality of individual wicking fibers 20 are threaded through, or otherwise attached to the support member 612.

The fibers 20 which are associated with the support member 612 are the same as previously discussed in connection with the first embodiment.

The fibers 20 are impregnated with a fuel vapor-adsorbing compound, as discussed herein in connection with the filter 10 of FIGS. 1–7.

SEVENTH EMBODIMENT

Figure 14:
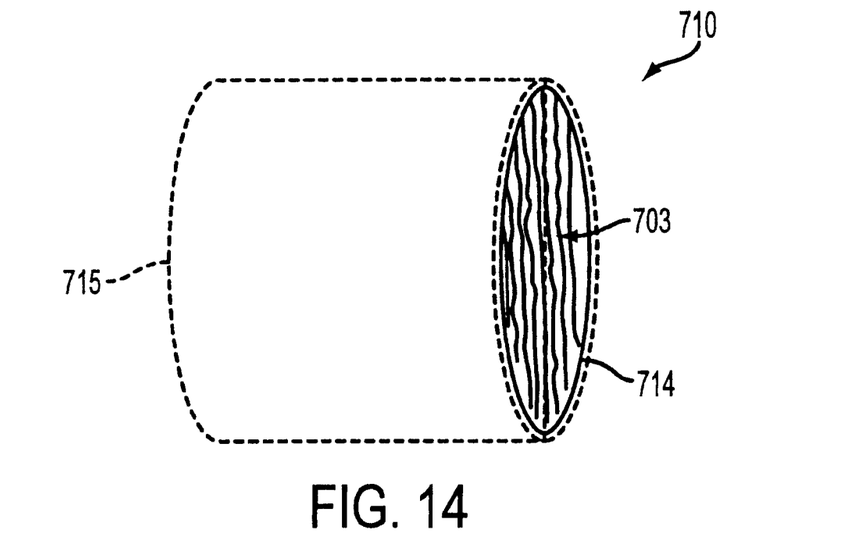
FIG. 14 is a perspective view of a filter element according to a seventh embodiment of the present invention, in which the filter includes multiple fiber strands, attached at their upper ends to a support, and hanging freely at the lower ends.

Referring now to FIG. 14, another filter assembly 710 is shown, in accordance with a seventh embodiment of the invention. In the embodiment of FIG. 14, the filter 710 includes an annular support band 714 which fits into the air flow passage 715. The filter 710 also includes a plurality of parallel fiber strands 703, which are connected at the upper ends thereof to the support band 714, and hang freely at the other.

The fibers 703 which are associated with the support member 612 are the same as the fibers 20 previously discussed in connection with the first embodiment, except that they are arranged in a substantially parallel array.

The fiber strands 703 are impregnated with a fuel vapor-adsorbing compound, as discussed herein in connection with the filter 10 of FIGS. 1–7.

EIGHTH EMBODIMENT

Figure 15:
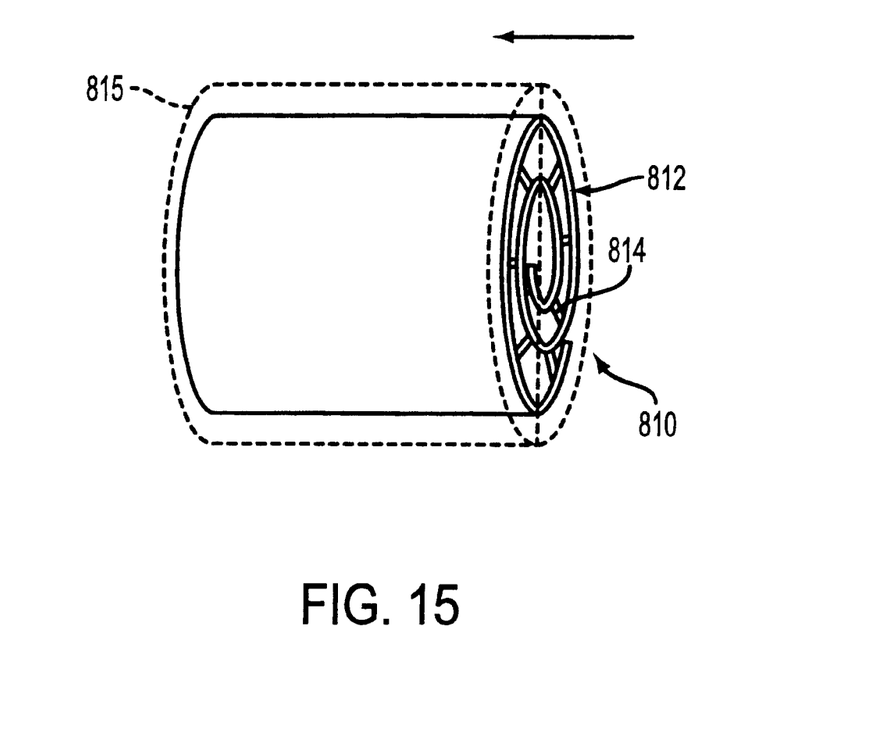
FIG. 15 is a perspective view of a filter element according to an eighth embodiment of the present invention, in which the filter is a nonwoven fiber mat that is rolled into a spiral.

Referring now to FIG. 15, another filter 810 for adsorbing fuel vapors is shown, in accordance with an eighth embodiment of the invention. In the embodiment of FIG. 15, the filter is made up primarily of a nonwoven fiber mat 812, which includes a plurality of individual fibers 20.

In forming the filter 810, the fiber mat 812 is rolled up into a spiral configuration, as shown, and is inserted into an intake air flow passage 815, associated with an internal combustion engine (not shown). The filter 810 may be placed in a flow passage such as a portion of an intake manifold.

The filter 810 may, optionally, also include a plurality of spacer members 814 attached to the fiber mat 812 to ensure that open air space is maintained between sections of the rolled-up fiber mat. The inclusion of the spacer members 814, where used, helps make sure that the back pressure across the filter 810 remains at an acceptable level.

The fibers 20 making up the fiber mat 812 are the same as previously discussed in connection with the first embodiment.

The fibers 20 are impregnated with a fuel vapor-adsorbing compound, as discussed herein in connection with the filter 10 of FIGS. 1–7.

NINTH EMBODIMENT

Figure 16:
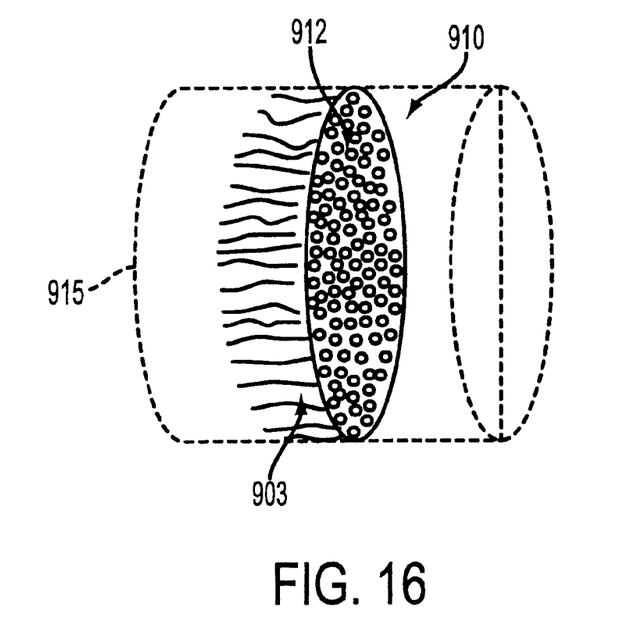
FIG. 16 is a perspective view of a filter element according to a ninth embodiment of the present invention, in which the filter includes a perforated support screen with multiple fiber strands attached to one side thereof and extending therefrom.

Referring now to FIG. 16, another filter 910 is shown, in accordance with a ninth embodiment of the invention. In the embodiment of FIG. 16, the filter 910 includes a foraminous screen 912 having a plurality of fiber strands 903 attached to the screen at one end thereof. The fiber strands are connected a first end thereof to the screen 912, as noted, and hang freely at the other. In this embodiment of a filter 910, the fiber strands 903 are substantially parallel to one another, in order to minimize pressure drop across the filter.

The filter 910 is provided for placement in an intake air flow passage 915, associated with an internal combustion engine (not shown). The filter assembly 910 may be placed in a flow passage such as a portion of an intake manifold.

The fibers 903 which are associated with the screen 912 are the same as the fibers 20 previously discussed in connection with the first embodiment, except that they are arranged in a substantially parallel array.

The fiber strands 903 are each impregnated with a fuel vapor-adsorbing compound, as discussed herein in connection with the filter 10 of FIGS. 1–7.

TENTH EMBODIMENT

Figure 17:
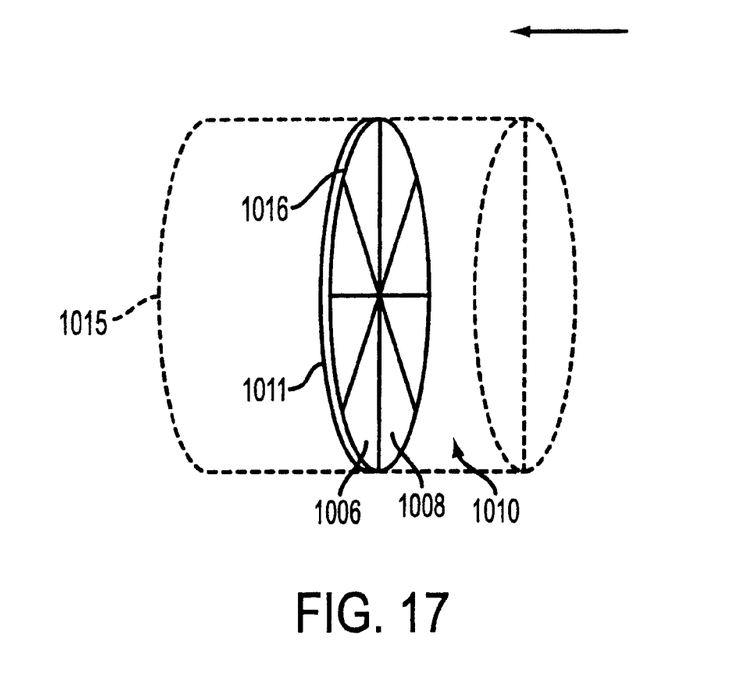
FIG. 17 is a perspective view of a filter element according to a tenth embodiment of the present invention, in which the filter includes a circular fiber mat which is divided into multiple wedge-shaped pieces to allow air flow therepast.

Referring now to FIG. 17, another filter assembly 1010 is shown, in accordance with a tenth embodiment of the invention. In the embodiment of FIG. 17, a disc-shaped filter element 1011, divided into wedge-shaped pieces, is affixed to an inner surface of a structural component containing an air flow passage 1015. Each of the wedge-shaped (wedges), such as the adjacent wedges 1006, 1008 is made up of a nonwoven fiber web made up of a plurality of individual fibers 20.

In this embodiment, in a manner similar to the first embodiment, the filter element 1011 may be attached to an annular support band 1016, similar to the band 16 shown in FIG. 2 in connection with the first embodiment. Alternatively, the filter element 1011 may be attached directly to the inner surface of the structural component containing the air flow passage 1015.

The individual wedges such as those shown at 1006, 1008 are not attached to one another at the side edges thereof. When air is flowing through the air flow passage 1015, it can push the tips of the wedges apart from one another, and flow through the center of the filter, but when air flow stops, the tips of the wedges will tend to move back together. The filter 1010 is mounted in the air flow passage 1015 so as to open when the engine is running, and to close when the engine is off.

The individual fibers 20 making up the filter element 1011 are the same as previously discussed in connection with the filter 10 according to the first embodiment.

The fibers 20 are impregnated with a fuel vapor-adsorbing compound, as discussed herein in connection with the filter 10 of FIGS. 1–7.

ELEVENTH EMBODIMENT

Figure 18:
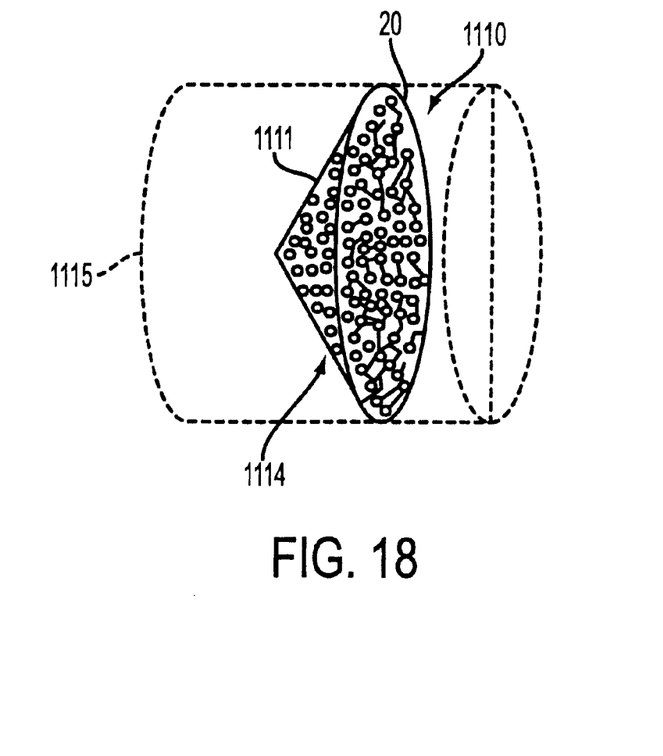
FIG. 18 is a perspective view of a filter element according to an eleventh embodiment of the present invention, in which the filter includes a conical support screen having multiple fibers attached thereto.

Referring now to FIG. 18, another filter assembly 1110 is shown, in accordance with an eleventh embodiment of the invention. In the embodiment of FIG. 18, the filter 1110 is provided in the form of a conical filter element 1111, for placement in an intake air flow passage 1115. The cone-shaped filter element 111 includes a foraminous conical screen 1114.

A plurality of individual wicking fibers 20 are threaded through, or otherwise attached to the screen 1114, and these individual fibers are the same as the fibers 20 previously discussed in connection with the filter 10 according to the first embodiment.

The fibers 20 are impregnated with a fuel vapor-adsorbing compound, as discussed herein in connection with the filter 10 of FIGS. 1–7.

TWELFTH EMBODIMENT

Figure 19:
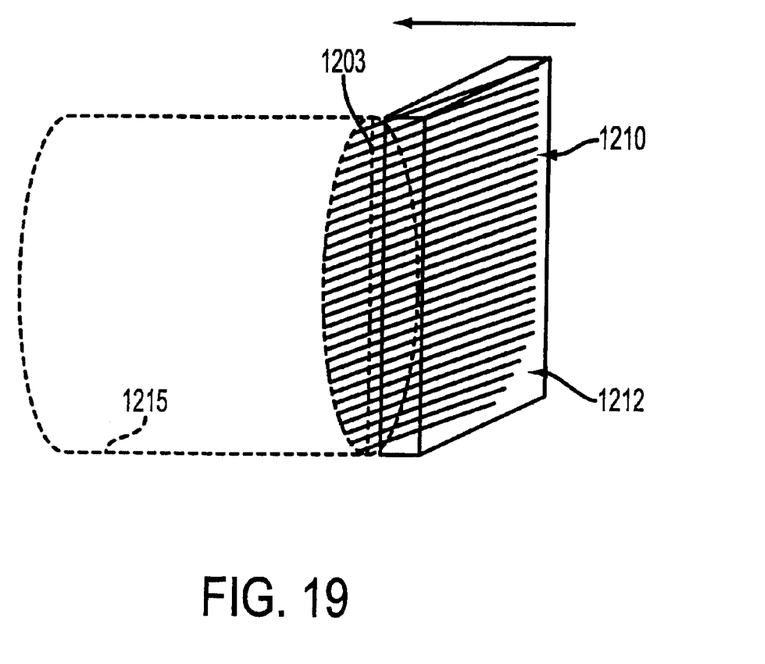
FIG. 19 is a perspective view of a filter element according to a twelfth embodiment of the present invention, in which the filter includes a liquid-filled reservoir, and multiple fibers in a substantially parallel array with one end of each of the fibers disposed in the liquid reservoir.

Referring now to FIG. 19, another filter assembly 1210 is shown, in accordance with a twelfth embodiment of the invention. In the embodiment of FIG. 19, the filter 1210 includes a liquid-filled reservoir 1212, filled with a non-volatile organic liquid such as a mineral oil or paraffin oil, and a plurality of individual wicking fibers 1203 arranged in a parallel array. The fibers 1203 are arranged with one end thereof in the reservoir 1212, and the other end extending across an airflow passage 1215 in a structural component of a vehicle intake system. The filter assembly 1210 may be placed at the end of a flow passage such as a portion of an intake manifold.

The fibers 1203 are the same as the fibers 20 previously discussed in connection with the first embodiment, except that they are arranged in a substantially parallel array.

THIRTEENTH EMBODIMENT

Figure 20:
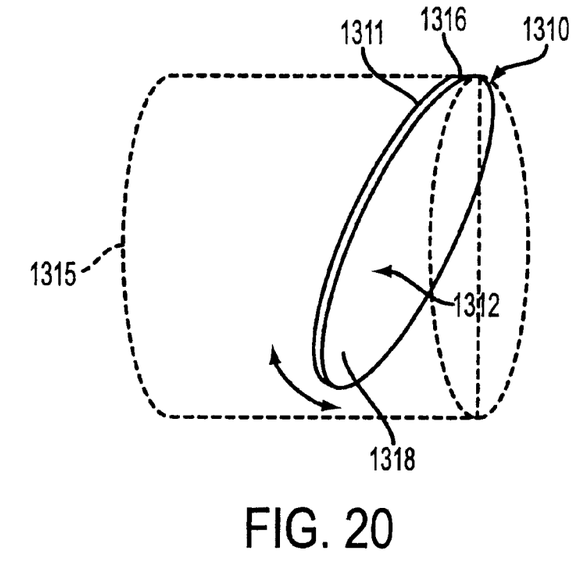
FIG. 20 is a perspective view of a filter element according to a thirteenth embodiment of the present invention, in which the filter includes a fiber web having an upper end attached to a support, and a lower end which is freely movable.

Referring now to FIG. 20, another filter assembly 1310 is shown, in accordance with a thirteenth embodiment of the invention. In the embodiment of FIG. 20, the disc-shaped filter element 1311 includes a nonwoven fiber web 1312. The fiber web 1312 is formed from a plurality of individual wicking fibers 20. The upper end 1316 of the filter element 1311 is swingably attached to an inner surface of the structural element containing the air flow passage 1315, while the lower end 1318 thereof is unattached and is allowed to move freely in the flow passage, as indicated by the two-headed arrow in the drawing.

The filter assembly 1310 may be placed in a flow passage such as a portion of an intake manifold. When air is flowing through the flow passage 1315, it will tend to push the filter element 1311 inwardly, and will be allowed to pass below and around the lower end 1318. When no air is flowing through the flow passage 1315, the filter element 1311 will tend to drop down to a position blocking the flow passage. This permits the filter 1310 to have less effective pressure drop than a filter which stays in place in the passage.

The individual fibers making up the fiber web 1312 are the same as the fibers 20 previously discussed in connection with the filter 10 according to the first embodiment.

The fibers 20 are impregnated with a fuel vapor-adsorbing compound, as discussed herein in connection with the filter 10 of FIGS. 1–7.

FOURTEENTH EMBODIMENT

Figure 21:
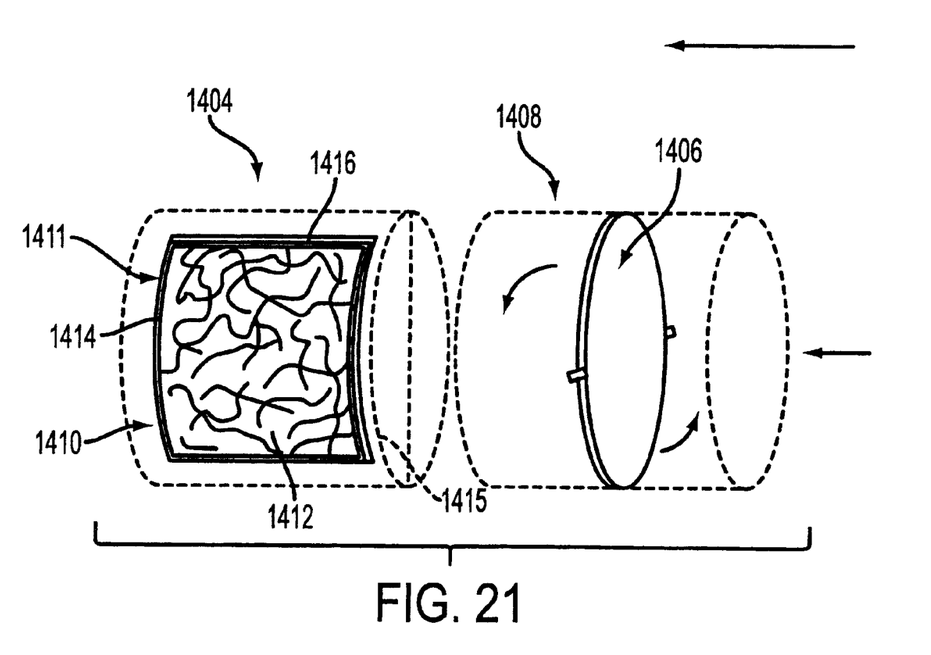
FIG. 21 is a perspective view of a filter element according to a fourteenth embodiment of the present invention, in which the filter has an arcuate shape and is attached to a side wall of a neck portion of an intake manifold downstream of the throttle plate.

Referring now to FIG. 21, a vapor-adsorbent filter in accordance with a fourteenth embodiment of the present invention is shown generally at 1410.

The filter 1410 is provided for placement in an intake airflow passage 1415, associated with an internal combustion engine (not shown). The filter 1410 is shown attached to a side wall of a neck portion of an intake manifold 1404, downstream of a throttle plate 1406 which is housed in a conventional throttle body 1408.

The filter 1410 includes a filter element 1411, which comprises a porous non-woven fiber web 1412 made up of a plurality of individual fibers 20 (FIG. 3). It will be understood from a review of FIG. 21 that the filter element 1411, in this embodiment, has an arcuate cross-sectional shape, when a cross-section thereof is taken along a plane parallel to the throttle plate 1406 in its closed position. In the filter element 1411, since the fiber web 1412 is placed along the side wall of the air flow passage 1415, it will have a minimal impact on air flow therepast, and will not create a barrier to decrease engine performance.

The filter 1410 of this embodiment will be exposed to the environment inside the intake manifold downstream of the throttle plate 1406. Therefore, the filter 1410 will still be effective to remove fuel vapors from the air inside the intake manifold 1404 after the engine is shut off and the throttle plate is closed.

Optionally, if desired, the filter 1410 may include a reinforcing frame member 1414, such as the peripheral frame 1416 shown in FIG. 22, attached to and surrounding the fiber web 1412, in order to provide support thereto, and to provide a solid member for engaging a side wall of the air flow passage 1415. Alternatively, the filter element 1411 may consist primarily of a fiber web 1412, adapted to be attached to the inner surface of the structural element 1404 defining the air flow passage 1415.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

Having, thus, described the invention, what is claimed is:

1. An air intake for an internal combustion engine comprising:
   an intake air flow passage;
   a filter element disposed within said air flow passage to remove fuel vapors from said passage, said filter element comprising a plurality of fibers;
   each of the fibers having an outer surface;
   each of the fibers further having a longitudinally extending internal cavity formed therein, and having a longitudinally extending slot formed therein extending from the internal cavity to the outer fiber surface; and
   a hydrocarbon-absorbing material disposed within the internal cavities of the fibers,
      wherein said filter element is configured so as to be in a blocking relation across said air flow passage when said engine is not in operation such that any fuel vapor in said air flow passage must contact said filter element, and to provide a pressure drop of less than 5 inches of mercury at a flow rate of 5000 ft$^3$ per minute when said engine is in operation and drawing air through said air flow passage.

2. The air intake of claim 1, wherein each of the elongated fibers includes a central stem and a plurality of lobes extending outwardly from the central stem, with each lobe having a longitudinally extending internal cavity on each side thereof, whereby a longitudinally extending slot is defined between adjacent lobes.

3. The air intake of claim 1, wherein the filter element is attached to the rear (outlet) side of a throttle plate in said air flow passage.

4. The air intake of claim 1, wherein the filter element comprises a non-woven fiber web.

5. The air intake of claim 4 wherein the non-woven fiber web is disc-shaped.

6. The air intake of claim 1, wherein the filter element comprises a plurality of aligned parallel pivotally rotatable louvers.

7. The filter of claim 1, wherein the filter element comprises two spaced apart support members, with the fibers arranged in an array wherein they extend from one of said supports to the other of said supports and are substantially parallel to one another.

8. The air intake of claim 4, wherein the fiber web has a substantially arcuate cross-sectional shape for placement against a side wall of a structural element containing said air flow passage.

9. The air intake of claim 1, wherein the filter element comprises a support member having a plurality of strands of said fibers attached thereto, each of said strands being attached to the support on one end and hanging freely at its other end.

10. The air intake of claim 1, wherein the filter comprises two opposed semi-circular plates, and a nonwoven fiber web attached to each of the plates.

11. The air intake of claim 4, wherein the filter includes plural filter sections, each of the filter sections comprising a non-woven fiber web.

12. The air intake of claim 4, wherein the fiber web is rolled into a spiral configuration.

13. The air intake of claim 4, wherein the non-woven fiber web is attached to a support member adapted to be pivotably mounted in said intake air flow passage.

14. The air intake of claim 1, wherein the hydrocarbon-absorbing material comprises a non-volatile organic solvent, wherein the filter further comprises a fluid reservoir containing a quantity of said organic solvent, and wherein one end of each of said fibers is disposed in fluid communication with said fluid reservoir.

15. The air intake of claim 11, wherein each of the filter sections is substantially wedge-shaped, and wherein the fiber sections cooperate to define a disc-shaped filter element.

16. The air intake of claim 9, wherein the support member is conically shaped.

* * * * *